United States Patent
Fan et al.

(10) Patent No.: US 12,489,930 B2
(45) Date of Patent: Dec. 2, 2025

(54) DEVICE CONTROL METHOD, SYSTEM AND APPARATUS, SERVER, AND MEDIUM

(71) Applicant: BOE Technology Group Co., Ltd., Beijing (CN)

(72) Inventors: Panwei Fan, Beijing (CN); Ruixiang Chen, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/293,720

(22) PCT Filed: Feb. 20, 2023

(86) PCT No.: PCT/CN2023/077097
§ 371 (c)(1),
(2) Date: Jan. 30, 2024

(87) PCT Pub. No.: WO2023/185314
PCT Pub. Date: Oct. 5, 2023

(65) Prior Publication Data
US 2025/0119595 A1    Apr. 10, 2025

(30) Foreign Application Priority Data
Mar. 30, 2022   (CN) .......................... 202210334279.1

(51) Int. Cl.
*H04N 21/231* (2011.01)
*H04N 5/76* (2006.01)
*H04N 21/2747* (2011.01)

(52) U.S. Cl.
CPC ............. *H04N 21/231* (2013.01); *H04N 5/76* (2013.01); *H04N 21/2747* (2013.01)

(58) Field of Classification Search
None
See application file for complete search history.

(56) References Cited

U.S. PATENT DOCUMENTS 8,209,729 B2 *  6/2012  Phillips ............ H04N 21/25891
                                                   725/135
8,413,204 B2 *  4/2013  White ................. H04L 12/2809
                                                   725/110
(Continued)

FOREIGN PATENT DOCUMENTS

CN       105450964 A     3/2016
CN       106162219 A    11/2016
(Continued)

OTHER PUBLICATIONS

PCT/CN2023/077097 international search report dated Jun. 1, 2023.
PCT/CN2023/077097 Written Opinion dated Jun. 1, 2023.

*Primary Examiner* — An Son P Huynh
(74) *Attorney, Agent, or Firm* — IPro, PLLC

(57) ABSTRACT

The present disclosure relates to a device control method, system and apparatus, a server, and a medium. According to the present disclosure, in response to a recording plan creation instruction, a recording plan that includes at least a device identifier of a video device for video recording is generated, and the generated recording plan is stored. Since the device identifier of the video device is globally unique, in a case where recording conditions of a stored target recording plan are met, a second server is controlled to interact with a target video device indicated by a device identifier in the target recording plan and perform video recording through a target port in the target video device, thereby making it more convenient and flexible to control the video device to perform recording.

20 Claims, 8 Drawing Sheets

(56) References Cited

U.S. PATENT DOCUMENTS

| | | | |
|---|---|---|---|
| 10,455,276 B2* | 10/2019 | Guerra | H04N 21/43615 |
| 2005/0086356 A1 | 4/2005 | Shah et al. | |
| 2005/0198629 A1* | 9/2005 | Vishwanath | G06F 8/61 |
| | | | 717/174 |
| 2006/0077254 A1* | 4/2006 | Shu | G08B 13/19682 |
| | | | 348/E7.086 |
| 2007/0136229 A1* | 6/2007 | Shinkai | H04L 67/12 |
| 2007/0157281 A1* | 7/2007 | Ellis | H04N 21/4147 |
| | | | 725/74 |
| 2011/0078717 A1* | 3/2011 | Drummond | H04N 21/4821 |
| | | | 715/764 |
| 2012/0117339 A1* | 5/2012 | Kandekar | G06F 16/13 |
| | | | 711/159 |
| 2012/0311635 A1* | 12/2012 | Mushkatblat | H04N 21/485 |
| | | | 725/43 |
| 2015/0310025 A1* | 10/2015 | Rathgeber | G06F 16/125 |
| | | | 707/662 |
| 2017/0201724 A1* | 7/2017 | Galvin | G08B 13/19665 |
| 2018/0103090 A1 | 4/2018 | Jin et al. | |
| 2020/0099896 A1* | 3/2020 | Galvin | G01D 3/022 |

FOREIGN PATENT DOCUMENTS

| | | |
|---|---|---|
| CN | 108875602 A | 11/2018 |
| CN | 109936751 A | 6/2019 |
| CN | 111182251 A | 5/2020 |
| CN | 111737292 A | 10/2020 |
| CN | 112183480 A | 1/2021 |
| CN | 112513817 A | 3/2021 |
| EP | 4195045 A1 | 6/2023 |

* cited by examiner

Video device configuration

| Platform connection manner | 28181 ▽ |
|---|---|
| ☑ Start | |
| Protocol version | GB/T28181-2016 ▽ |
| SIP server ID | 11011500492000000002 |
| SIP server address | 10.10.86.125 |
| SIP username | 33020000001320000000 |
| SIP user authentication ID | 33020000001320000000 |
| Password | 12345 |
| Password confirmation | 12345 |

| Video channel encoding ID | Channel number | Video channel encoding ID |
|---|---|---|
| | 1 | 33020000001320000001 |

FIG. 3

| Name | Type | Length | Comment |
|---|---|---|---|
| deviveid | varcher | 50 | device identifier |
| name | varcher | 50 | device name |
| manufacturer | varcher | 50 | device manufacturer |
| transport | varcher | 50 | device default port |
| online | varcher | 50 | online state |
| registertime | varcher | 50 | registration time |
| ip | varcher | 50 | IP address |
| user_name | varcher | 50 | device username |
| pwd | varcher | 50 | device password |

FIG. 4

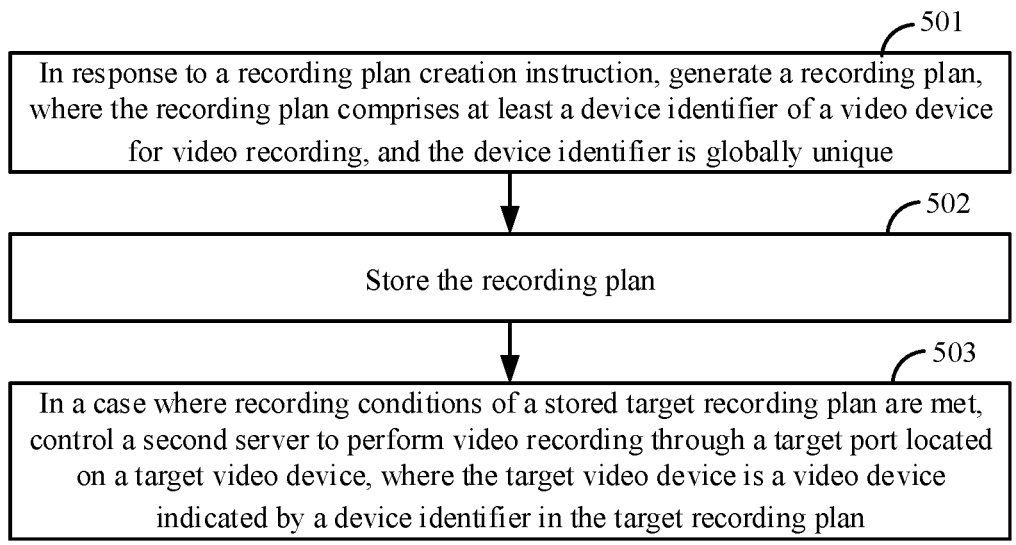

FIG. 5

| Name | Type | Length | Comment |
|---|---|---|---|
| id | int8 | 64 | primary key |
| plan_name | varcher | 50 | plan name |
| plan_type | int4 | 32 | recording cycle |
| device_id | varcher | 50 | device identifier |
| channel_id | varcher | 50 | channel identifier |
| retention_time | int4 | 32 | video retention time, unit: day |
| is_enable | int4 | 32 | plan state: 0-stop; 1-enable |
| create_time | varcher | 50 | creation time |
| update_time | varcher | 50 | update time |
| rec_status | int4 | 32 | recording state: 0-not recording, 1-recording |

FIG. 6

| Name | Type | Length | Comment |
|---|---|---|---|
| id | int8 | 64 | primary key |
| plan_id | int8 | 64 | plan identifier |
| plan_type | int4 | 32 | recording cycle |
| calendar | int4 | 32 | recording date |
| begin_time | varcher | 50 | recording begin time |
| end_time | varcher | 50 | recording end time |
| create_time | varcher | 50 | creation time |
| update_time | varcher | 50 | update time |

FIG. 7

| Name | Type | Length | Comment |
|---|---|---|---|
| id | int8 | 64 | primary key |
| plan_id | int8 | 64 | plan identifier |
| calendar_id | int4 | 64 | plan detail identifier |
| device_id | varcher | 50 | device identifier |
| channel_id | varcher | 50 | channel identifier |
| stream_id | varcher | 150 | video stream identifier |
| begin_time | varcher | 50 | recording begin time |
| end_time | varcher | 50 | recording end time |
| create_time | varcher | 50 | creation time |
| update_time | varcher | 50 | update time |
| rec_status | int4 | 32 | recording state: 0-not recording, 1-recording |
| media_server_id | varcher | 200 | server identifier of second server |

FIG. 8

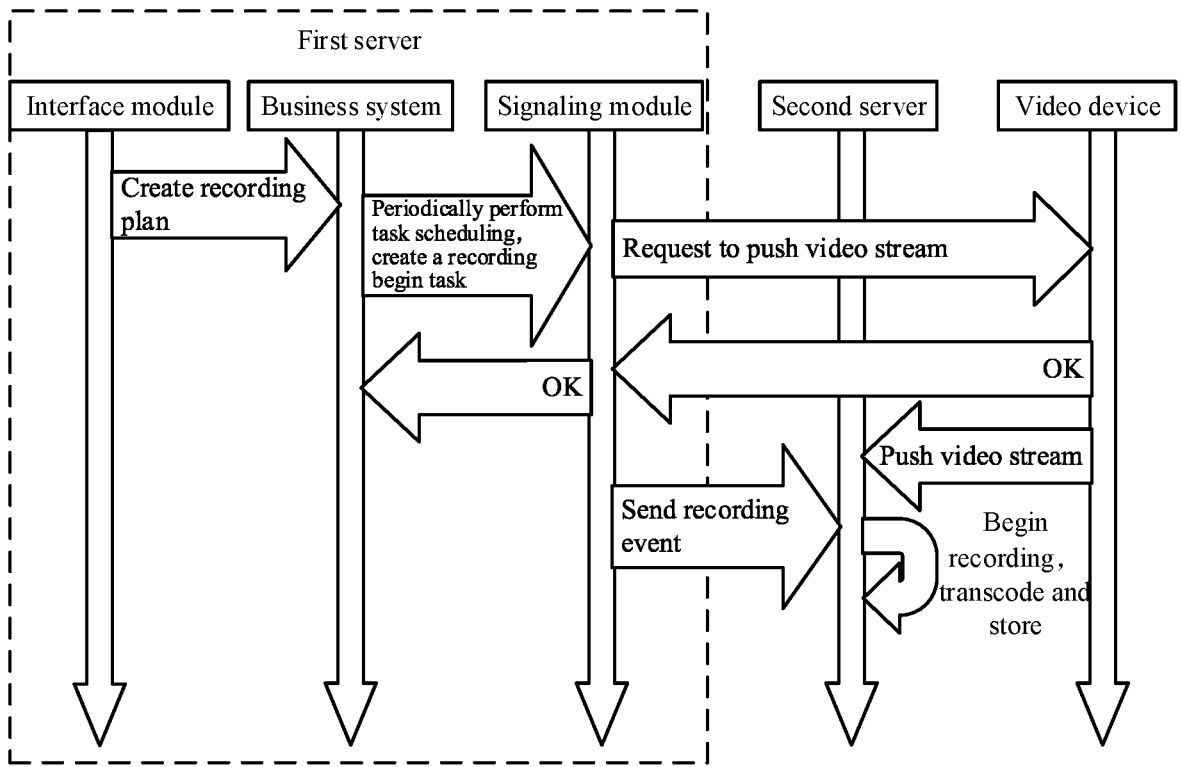

FIG. 9

| Name | Type | Length | Comment |
|---|---|---|---|
| id | int8 | 64 | primary key |
| reg_log_id | int8 | 64 | recording log identifier |
| device_id | varcher | 50 | device identifier |
| channel_id | varcher | 50 | channel identifier |
| stream_id | varcher | 150 | video stream identifier |
| rec_src | varcher | 200 | video file address |
| expire_time | varcher | 50 | expiration time |
| create_time | varcher | 50 | creation time |
| update_time | varcher | 50 | update time |
| begin_time | varcher | 50 | recording begin time |
| end_time | varcher | 50 | recording end time |

FIG. 10

DEVICE CONTROL METHOD, SYSTEM AND APPARATUS, SERVER, AND MEDIUM

CROSS-REFERENCE TO RELATED APPLICATIONS

This application is a national stage of international PCT Application No. PCT/CN2023/077097 filed on Feb. 20, 2023, the entire contents of which are incorporated herein by reference.

TECHNICAL FIELD

The present disclosure relates to the field of computer technology, and in particular, to a device control method, system and apparatus, a server, and a medium.

BACKGROUND

With the development of digital life, video technology is increasingly popular in life. Managing a video recording process of video devices (such as cameras) has always been a complex and difficult project, especially, in real scenarios where there are a large variety and number of video devices, and manufacturers are different, resulting in more complex recording management of video devices. Therefore, there is an urgent need for a device control method to more conveniently and flexibly control multiple video devices to perform recording.

SUMMARY

The present disclosure provides a device control method, system and apparatus, a server, and a medium to address deficiencies in the related art.

According to a first aspect of embodiments of the present disclosure, there is provided a device control method, including: in response to a recording plan creation instruction, generating a recording plan, where the recording plan includes at least a device identifier of a video device for video recording, and the device identifier is globally unique; storing the recording plan; and in a case where recording conditions of a stored target recording plan are met, controlling a second server to perform video recording through a target port in a target video device, where the target video device is a video device indicated by a device identifier in the target recording plan.

In some embodiments, the first server is composed of N-level servers; in a case where the recording conditions of the stored target recording plan are met, controlling the second server to perform video recording through the target port in the target video device includes: in a case where the recording conditions of the stored target recording plan are met, determining, by an $N^{th}$ level first server, a first level first server corresponding to the target video device and a higher level server corresponding to the first level first server; and controlling, by the $N^{th}$ level first server, the first level first server through the higher level server of the first level first server, so that the first level first server controls a second server corresponding to the target video device to perform video recording through the target port.

In some embodiments, the recording conditions include recording begin conditions and recording end conditions; in a case where the recording conditions of the stored target recording plan are met, controlling the second server to perform video recording through the target port in the target video device includes: in a case where the recording begin conditions are met, controlling the second server to acquire videos recorded by the target video device through the target port; and in a case where the recording end conditions are met, controlling the second server to stop acquiring the videos recorded by the target video device through the target port.

In some embodiments, in a case where the recording begin conditions are met, controlling the second server to acquire the videos recorded by the target video device through the target port includes: in a case where the recording begin conditions are met, enabling the target port of the target video device; and sending a port number of the target port, as well as the device identifier and an Internet Protocol (IP) address of the target video device to the second server, where the second server is configured to acquire the videos recorded by the target video device from the target port of the target video device based on the device identifier and the IP address.

In some embodiments, the recording plan further includes time information, and the time information includes a recording begin time; in a case where the recording begin conditions are met, enabling the target port of the target video device includes: in a case where a recording begin time of the target recording plan is arrived, enabling the target port of the target video device.

In some embodiments, storing the recording plan includes: storing the recording plan in a target database; and before, in a case where the recording begin conditions are met, controlling the second server to acquire the videos recorded by the target video device through the target port, the method further includes: detecting a recording begin time of each recording plan stored in the target database.

In some embodiments, storing the recording plan in the target database includes: storing the recording plan in a table mode in the target database.

In some embodiments, the time information further includes a recording date and a recording cycle, and the recording plan further includes a plan name, a plan identifier, a channel identifier, a video retention time, a plan state, and a recording state; storing the recording plan in the table mode in the target database includes: storing the plan name, the recording cycle, the device identifier, the channel identifier, the video retention time, the plan state, and the recording state of the recording plan through a first table; and storing the plan identifier, the recording cycle, the recording date, the recording begin time, and a recording end time of different-date-recording plans included in the recording plan respectively through at least one second table.

In some embodiments, enabling the target port of the target video device includes: generating a port number for the target recording plan; and sending a port enabling instruction to the target video device, where the port enabling instruction carries the port number, and the target video device is configured to, in response to the port enabling instruction, enable a target port corresponding to the port number on the target video device.

In some embodiments, the device identifier is obtained by performing encoding by using a target protocol; sending the port enabling instruction to the target video device includes: sending the port enabling instruction to the target video device by using an instruction set of the target protocol.

In some embodiments, the method further includes: in a case where the recording begin conditions are met, creating a log record for the target recording plan, where the log record includes at least a video stream identifier of videos corresponding to the target recording plan.

In some embodiments, in a case where the recording end conditions are met, controlling the second server to stop acquiring the videos recorded by the target video device through the target port includes: in a case where the recording end conditions are met, sending a recording stop instruction to the second server, where the recording stop instruction carries the video stream identifier.

In some embodiments, the recording plan further includes time information, and the time information includes a recording end time; in a case where the recording end conditions are met, sending the recording stop instruction to the second server includes: in a case where the recording end time is arrived, sending the recording stop instruction to the second server.

In some embodiments, after, in a case where the recording end conditions are met, sending the recording stop instruction to the second server, the method further includes at least one of the followings: storing the recorded videos through a hard disk of a third server to obtain video files; or storing the recorded videos through cloud storage to obtain video files.

In some embodiments, the recording plan further includes expiration times of the video files; the method further includes: in a case where the expiration times of the video files are arrived, deleting expired video files.

According to a second aspect of the embodiments of the present disclosure, there is provided a device control system, including: a first server, a second server, and at least one video device, where the first server is configured to, in response to a recording plan creation instruction, generate and store a recording plan, where the recording plan includes at least a device identifier of a video device for video recording, and the device identifier is globally unique; the first server is further configured to control the at least one video device to perform video recording through the second server based on the stored recording plan; the second server is configured to control the at least one video device to perform video recording through a target port in the video device; the video device is configured to perform video recording.

In some embodiments, the recording plan further includes time information, and the time information includes a recording begin time and/or a recording end time; the first server is further configured to detect recording begin times and/or recording end times of stored recording plans.

In some embodiments, the device control system further includes: a third server, where the third server is configured to store videos recorded by the video device through a hard disk to obtain video files.

In some embodiments, the first server is composed of N-level servers, and the video device is pre-registered on the first server; a process of registering the video device includes: sending, by the video device, device information to a first level first server corresponding to the video device, and storing the device information through the first level first server, where the device information includes at least device manufacturer information, a username and a password, a device IP address, a device identifier of the video device, and channel information; and sending the device identifier of the video device to a second level first server through the first level first server, storing the device identifier through the second level first server, and sending the device identifier of the video device, level by level, up to a first server at each level through the second level first server, until an $N^{th}$ level server in the first server completes storage of the device identifier.

According to a third aspect of the embodiments of the present disclosure, there is provided a device control apparatus, including: a generation unit, configured to, in response to a recording plan creation instruction, generate a recording plan, where the recording plan includes at least a device identifier of a video device for video recording, and the device identifier is globally unique; a storage unit, configured to store the recording plan; and a control unit, configured to, in a case where recording conditions of a stored target recording plan are met, control a second server to perform video recording through a target port in a target video device, where the target video device is a video device indicated by a device identifier in the target recording plan.

In some embodiments, the first server is composed of N-level servers; the control unit, when, in a case where the recording conditions of the stored target recording plan are met, controlling the second server to perform video recording through the target port in the target video device, is configured to: in a case where the recording conditions of the stored target recording plan are met, determine a first level first server corresponding to the target video device and a higher level server corresponding to the first level first server; control the first level first server through the higher level server of the first level first server, so that the first level first server controls a second server corresponding to the target video device to perform video recording through the target port.

In some embodiments, the recording conditions include recording begin conditions and recording end conditions; the control unit, when, in a case where the recording conditions of the stored target recording plan are met, controlling the second server to perform video recording through the target port in the target video device, includes a first control sub-unit and a second control sub-unit, where the first control sub-unit is configured to, in a case where the recording begin conditions are met, control the second server to acquire videos recorded by the target video device through the target port; the second control sub-unit is configured to, in a case where the recording end conditions are met, control the second server to stop acquiring the videos recorded by the target video device through the target port.

In some embodiments, the first control sub-unit, when, in a case where the recording begin conditions are met, controlling the second server to acquire the videos recorded by the target video device through the target port, is configured to: in a case where the recording begin conditions are met, enable the target port of the target video device; send a port number of the target port, as well as a device identifier and an Internet Protocol IP address of the target video device to the second server, where the second server is configured to acquire the videos recorded by the target video device from the target port of the target video device based on the device identifier and the IP address.

In some embodiments, the recording plan further includes time information, and the time information includes a recording begin time; the first control sub-unit, when, in a case where the recording begin conditions are met, enabling the target port of the target video device, is configured to: in a case where a recording begin time of the target recording plan is arrived, enable the target port of the target video device.

In some embodiments, the storage unit, when storing the recording plan, is configured to: storing the recording plan in a target database; the apparatus further includes: a detection unit, configured to detect a recording begin time of each recording plan stored in the target database.

In some embodiments, the storage unit, when storing the recording plan in the target database, is configured to: store the recording plan in a table mode in the target database.

In some embodiments, the time information further includes a recording date and a recording cycle, and the recording plan further includes a plan name, a plan identifier, a channel identifier, a video retention time, a plan state, and a recording state; the storing unit, when storing the recording plan in the table mode in the target database, is configured to: store the plan name, the recording cycle, the device identifier, the channel identifier, the video retention time, the plan state, and the recording state of the recording plan through a first table; store the plan identifier, the recording cycle, the recording date, the recording begin time, and a recording end time of different-date-recording plans included in the recording plan respectively through at least one second table.

In some embodiments, the first control sub-unit, when enabling the target port of the target video device, is configured to: generate a port number for the target recording plan; send a port enabling instruction to the target video device, where the port enabling instruction carries the port number, and the target video device is configured to, in response to the port enabling instruction, enable a target port corresponding to the port number on the target video device.

In some embodiments, the device identifier is obtained by performing encoding by using a target protocol; the first control sub-unit, when sending the port enabling instruction to the target video device, is configured to: send the port enabling instruction to the target video device by using an instruction set of the target protocol.

In some embodiments, the apparatus further includes: a creation unit, configured to, in a case where the recording begin conditions are met, create a log record for the target recording plan, where the log record includes at least a video stream identifier of videos corresponding to the target recording plan.

In some embodiments, the second control sub-unit, when, in a case where the recording end conditions are met, controlling the second server to stop acquiring the videos recorded by the target video device through the target port, is configured to: in a case where the recording end conditions are met, send a recording stop instruction to the second server, where the recording stop instruction carries the video stream identifier.

In some embodiments, the recording plan further includes time information, and the time information includes a recording end time; the second control sub-unit, when, in a case where the recording end conditions are met, sending the recording stop instruction to the second server, is configured to: in a case where the recording end time is arrived, send the recording stop instruction to the second server.

In some embodiments, the storage unit is further configured to store the recorded videos through a hard disk of a third server to obtain video files; the storage unit is further configured to store the recorded videos through cloud storage to obtain video files.

In some embodiments, the recording plan further includes expiration times of the video files; the apparatus further includes: a deletion unit, configured to, in a case where the expiration times of the video files are arrived, delete stored video files.

According to a fourth aspect of the embodiments of the present disclosure, there is provided a server, including: a memory, a processor, and a computer program stored in the memory and capable of running on the processor, where the program is executed by the processor to perform the operations in the device control method according to the first aspect and any one of optional embodiments in the first aspect.

According to a fifth aspect of the embodiments of the present disclosure, there is provided a computer readable storage medium, having a program stored on the computer readable storage medium, where the program is executed by a processor to perform the operations in the device control method according to the first aspect and any one of optional embodiments in the first aspect.

According to a sixth aspect of the embodiments of the present disclosure, there is provided a computer program product, including a computer program, where the program is executed by a processor to perform the operations in the device control method according to the first aspect and any one of optional embodiments in the first aspect.

As can be known from the above embodiments, in response to the recording plan creation instruction, the recording plan that includes at least the device identifier of the video device for video recording is generated, and the generated recording plan is stored; since the device identifier of the video device is globally unique, in a case where the recording conditions of the stored target recording plan are met, the second server is controlled to interact with the target video device indicated by the device identifier in the target recording plan and perform video recording through the target port in the target video device, making it more convenient and flexible to control the video device to perform recording.

It should be understood that the above general description and the following detailed description are only exemplary and explanatory and are not restrictive of the present disclosure.

BRIEF DESCRIPTION OF DRAWINGS

The accompanying drawings, which are incorporated in and constitute a part of this specification, illustrate examples consistent with the present disclosure and, together with the description, serve to explain the principle of the present disclosure.

FIG. 3 is a schematic diagram illustrating a configuration page according to an embodiment of the present disclosure.

FIG. 4 is a schematic diagram illustrating a mode of storing device information according to an embodiment of the present disclosure.

FIG. 5 is a flowchart illustrating a device control method according to an embodiment of the present disclosure.

FIG. 6 is a schematic diagram illustrating a first table according to an embodiment of the present disclosure.

FIG. 7 is a schematic diagram illustrating a second table according to an embodiment of the present disclosure.

FIG. 8 is a schematic diagram illustrating a recording log table according to an embodiment of the present disclosure.

FIG. 9 is a flowchart illustrating a recording begin process according to an embodiment of the present disclosure.

FIG. 10 is a schematic diagram illustrating a video file table according to an embodiment of the present disclosure.

DETAILED DESCRIPTION

Figure 1:
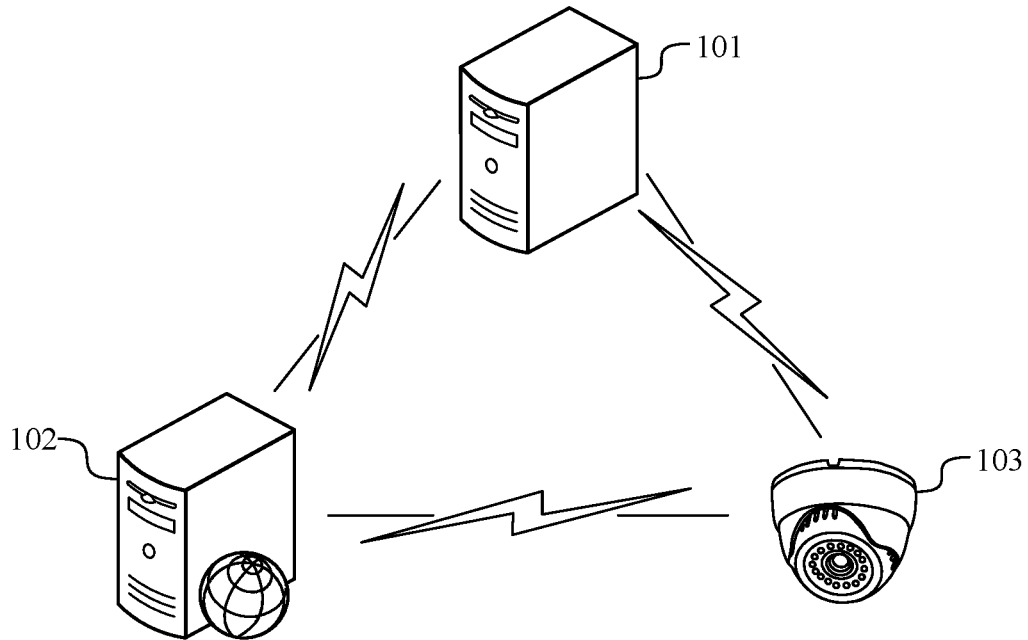
FIG. 1 is a system architecture diagram illustrating a device control system according to an embodiment of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

FIG. 1 is a system architecture diagram illustrating a device control system according to an embodiment of the present disclosure. As shown in FIG. 1, the device control system may include a first server 101, a second server 102, and a video device 103.

The first server 101 may be a signaling server, a video cloud platform, or the like. The signaling server may be a Session Initiation Protocol (SIP) server. The first server 101 may be configured to provide a device management function. The second server 102 may be a stream media server. The second server 102 may be configured to provide a video acquisition function (for example, pulling video streams). The video device 103 may include a camera, a Network Video Recorder (NVR), etc. Optionally, the first server 101, the second server 102, and the video device 103 may be other types of devices. Specific device types of the first server 101, the second server 102, and the video device 103 are not limited in the present disclosure.

It should be noted that communication between the first server 101 and the second server 102, between the first server 101 and the video device 103, and between the second server 102 and the video device 103 may be implemented in a wired or wireless connection manner.

The first server 101 may be configured to, in response to a recording plan creation instruction, generate and store a recording plan. The recording plan includes at least a device identifier of the video device for video recording, and the device identifier is globally unique. The first server 101 may be further configured to control at least one video device 103 to perform video recording through the second server 102 based on the stored recording plan. The second server 102 may be configured to control at least one video device 103 to perform video recording through a target port in the video device 103. The video device 103 may be configured to perform video recording.

Optionally, the first server 101, when controlling the video device 103 to perform video recording through the second server 102, may control the video device 103 to begin video recording through the second server 102, and further control the video device 103 to end video recording through the second server 102. That is, the second server 102 may control the video device 103 to begin video recording through the target port in the video device 103, or the second server 102 may control the video device 103 to end video recording through the target port in the video device 103.

The recording plan may further include time information, for example, a recording begin time and/or a recording end time, so that the first server 101 may control a begin and/or an end of a video recording process of the video device 103 through the second server 102 based on the time information included in the recording plan.

In a possible implementation manner, the first server 101 may be further configured to detect recording begin times and/or recording end times of stored recording plans. For example, the first server 101 may acquire a current time stamp, and determine whether one or more of the stored recording plans have arrived the recording begin times and/or the recording end times based on the acquired time stamp, achieving the detection on the recording begin times and/or the recording end times of the stored recording plans.

In some embodiments, the device control system may further include a third server. The third server may be configured to store videos recorded by the video device through a hard disk to obtain video files. The third server may be a file server. Optionally, the third server may be other types of servers that can provide a file storage function. Specific device types of the third server are not limited in the present disclosure.

In a possible implementation manner, the third server may communicate with the first server 101 in a wired or wireless connection manner, and the third server may further communicate with the second server 102 in a wired or wireless connection manner.

In the above connection manner, the second server 102, after acquiring the videos recorded by the video device 103, may store the recorded videos in the third server, and the first server 101 may acquire the videos recorded by the video device from the third server, so that users can view the videos recorded by the video device.

By disposing the third server, the videos can be stored in one location, and thus the videos can be managed more conveniently. Moreover, by storing the videos in the third server, the first server and the second server do not need to store the videos, reducing the processing pressure of the first server and the second server, and further improving the speed of video acquisition.

Optionally, the first server 101 may be further configured to store the videos recorded by the video device through cloud storage to obtain the video files; or, the second server 102 may be further configured to store the videos recorded by the video device through the cloud storage to obtain the video files.

The above is only a basic organization architecture mode of the device control system. In some embodiments, the first server 101 may be composed of N-level servers, and the second server 102 may be composed of M-level servers, so that multiple video devices may be managed through multi-level first servers and multi-level second servers.

For example, an $N^{th}$ level server may be connected to an $M^{th}$ level second server and an $(N-1)^{th}$ level first server, and further videos recorded by a corresponding video device are acquired through the $M^{th}$ level second server. The video device corresponding to the $M^{th}$ level second server may be directly connected to an $N^{th}$ level first server. In addition, the $N^{th}$ level server may be connected to the $(N-1)^{th}$ level first server. The $(N-1)^{th}$ level first server may be connected to an $(N-2)^{th}$ level first server and an $(M-1)^{th}$ level second server, and further videos recorded by a corresponding video device may be acquired through the $(M-1)^{th}$ level second server. The video device corresponding to the $(M-1)^{th}$ level second server may be directly connected to the $(N-1)^{th}$ level first server. By analogy, a cascade architecture of the device control system can be achieved.

The $N^{th}$ level first server may serve as a root node. The $(N-1)^{th}$ level first server to a first level first server and the $M^{th}$ level second server to a first level second server may serve as intermediate nodes. Therefore, connections between the root node and video devices are implemented through the intermediate nodes.

It should be noted that both the first server and the second server at each level may include multiple servers, achieving a distributed architecture of the device control system. For example, the $M^{th}$ level second server may include two second servers, so that videos recorded by two video devices are acquired respectively through the two second servers.

In addition, each device (including the first sever and the second server at each level, and each video device) has its own device identifier, and the device identifier of each device is a globally unique identifier. That is, the server identifier of each first server and each second server as well as a device identifier of each video device are globally unique device identifiers.

Figure 2:
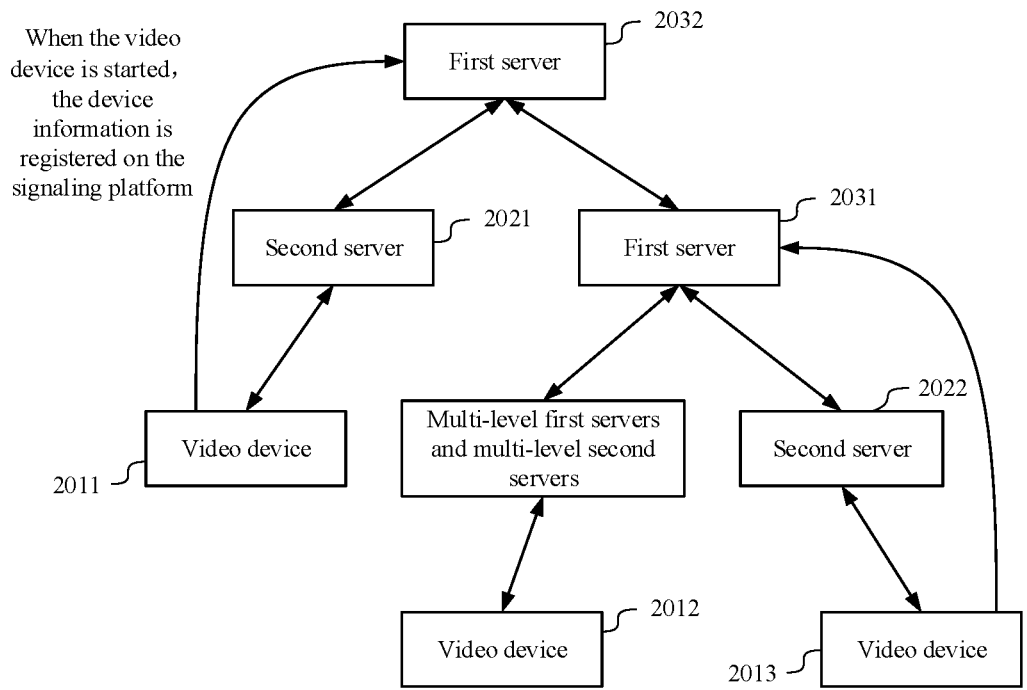
FIG. 2 is a system architecture diagram illustrating another device control system according to an embodiment of the present disclosure.

FIG. 2 is a system architecture diagram illustrating another device control system according to an embodiment of the present disclosure. As shown in FIG. 2, the device control system may include a video device 2011, a video device 2012, a video device 2013, as well as multi-level first servers and multi-level second servers. For the video device 2011, a second server 2021 may serve as a first level second server of the video device 2011, and a first server 2032 may serve as a first level first server of the video device 2011. For the video device 2012, which may correspond to the multi-level first servers and the multi-level second servers, a first server 2031 above the multi-level first servers and the multi-level second servers may serve as an $(N-1)^{th}$ level first server of the video device 2012, and the first server 2032 may serve as an $N^{th}$ level first server of the video device 2012. For the video device 2013, a second server 2022 may serve as a first level second server of the video device 2013, the first server 2031 may serve as a first level first server of the video device 2013, and the first server 2032 may serve as a second level first server of the video device 2013. Therefore, each video device may be managed through at least one level first server and at least one level second server, which enables each video device in the device control system to be managed.

As shown in FIG. 2, the device control system adopts a distributed architecture mode, so that the first servers at the same or different levels can be used separately. A failure of one first server will not affect the normal operation of other first servers, effectively avoiding a single point of failure, and improving system stability. For example, if the first server 2031 fails, the use of the second server 2021 will not be affected, and correspondingly, if the second server 2021 fails, the use of the first server 2031 will not be affected.

FIG. 2 shows only an exemplary distributed architecture mode. In more possible implementation manners, the device control system may include more or less devices. That is, both the first server and the second server at each level may include more or less servers. By adopting the distributed architecture mode shown in FIG. 2, it is convenient for the horizontal expansion of the device control system, so that a device control method provided in the present disclosure can adapt to management scenarios of multi-channel video devices.

For example, if it is desired that a video device is newly connected to the device control system shown in FIG. 2, a second server may be disposed below the first server 2032, so as to achieve video acquisition of the video device through the disposed second server. Optionally, the multi-level first servers and the multi-level second servers may be disposed below the first server 2032, so as to achieve video acquisition of the video device through the disposed multi-level first servers and multi-level second servers.

By adopting the distributed architecture mode shown in FIG. 2, it is very convenient to newly add a video device to the device control system, without affecting the operation of other video devices, which greatly improves the flexibility of the architecture for the device control system.

Moreover, the device control system shown in FIG. 2 adopts a cascade architecture mode. The first servers at different levels may be configured to manage different video devices, achieving hierarchical management of the video devices. The first servers at different levels may serve as division of different permissions.

The hierarchical architecture mode provided in the present disclosure can achieve edge deployment. A first server may be located in different regions from its corresponding lower level first server. Therefore, during the deployment, a first server may be deployed at an edge terminal. Only by applying for enabling network port permissions between the first server and other first server, video devices within a local area network can be managed through a first server outside the local area network.

Through the edge deployment scheme described above, the first server deployed at the edge terminal may serve as a bridge, so that the first server outside the local area network may control video devices in each region within the local area network through the first server deployed at the edge terminal. There is no need for each video device to enable network permissions outside the local area network, reducing the working pressure of the video device, and ensuring the security of devices within the local area network. Moreover, the device control system provided in the present disclosure may be deployed in multi-region network isolation scenarios, expanding application scenarios of the device control system provided in the present disclosure.

Taking two parks located in different regions as an example, devices inside the two parks need to communicate through their respective corresponding local area networks. By adopting the cascade architecture mode provided in the present disclosure, one first server may be deployed at an edge of the local area network of each of the two parks, and one first server may be deployed in a cloud as a higher level server of the first servers deployed at the edges of the local area networks of the two parks, so that the first servers deployed at the edges of the local area networks of the two parks are controlled through the first server located in the cloud, achieving control over the first servers, second servers, and video devices included within the local area networks of the two parks. By adopting the cascade architecture mode, the management of devices within two local area networks can be achieved outside the two local area networks.

Each device has its own device identifier, and the device identifier of each device is a globally unique identifier. That is, server identifiers of each first server and each second server as well as a device identifier of each video device are globally unique device identifiers. It should be noted that a hierarchical relationship between the first server and the second server at each level may be preset, so that, after the video device is connected to the video control system, only the video device may be registered. A process of registering the video device may include:

The video device may send device information to a first level first server corresponding to the video device, and the device information is stored through the first level first server, where the device information includes at least device manufacturer information, a username and a password, a device IP address, a device identifier of the video device, and channel information. After the first level first server stores the device information, the video device identifier of the video device may be sent to a second level first server through the first level first server; the second level first server stores the video device identifier, and the video device identifier of the video device is sent, level by level, up to a first server at each level through the second level first server, until an $N^{th}$ level server in the first server completes the storage of the device identifier.

The second level first server and the higher level first server of the second level first server, when storing the device identifier, may store the device identifier corresponding to a server identifier of the first server that sends the device identifier, achieving the association storage of the device identifier and the corresponding server identifier.

For example, for any first server of the second level first server and the higher level first server of the second level first server, the first server may adopt a mapping table mode to store the device identifier and the server identifier of the first server that sends the device identifier, so that the device identifier and the server identifier are in a mapping relationship, that is, the association storage of the device identifier and the corresponding server identifier is achieved.

A higher level server performs association storage of a device identifier and a server identifier of a lower level server that reports the device identifier, so that the higher level server can directly acquire a video device corresponding to each lower level first server based on a stored association relationship, achieving control over each video device through the corresponding lower level first server.

In a possible implementation manner, the lower level first server, when sending the device information or the device identifier to the higher level first server, may send a registration request carrying the device information or the device identifier to the higher level first server, so that the first server receiving the registration request may store the device information or the device identifier carried in the registration request based on the received registration request, so as to achieve the registration of the video device on the first server.

It should be noted that the process of registering the video device may be automatically executed after the video device is started. That is, for any video device, after the video device is started, the just started video device may be registered through the process described above.

Taking the device control system shown in FIG. 2 as an example, a process of registering the video device 2013 may include:

The video device 2013 may send device information to first level first server (i.e., the first server 2031) corresponding to the video device 2013, and the first server 2031 may store the received device information, so as to achieve the registration of the video device 2013 on the first server 2031; the first server 2031 may send a device identifier of the video device 2013 to a second level first server corresponding to the video device 2013 (i.e., the first server 2032), and the first server 2032 may store the received device identifier, so as to achieve the registration of the video device 2013 on the first server 2032. It should be noted that, for the video device 2013, the first servers corresponding to the video device 2013 are composed of only two level first servers. Therefore, after the first server 2032 served as the second level first server, completes the storage of the device identifier of the video device 2013, the registration of the video device 2013 on higher level servers corresponding to the video device 2013 (i.e., the second server 2022, the first server 2031, and the first server 2032) has been achieved. The registration of the video device 2013 on the device control system is completed.

Processes of registering the video device 2011 and the video device 2012 are the same as the process of registering the video device 2013, which will not be repeated here.

It should be noted that the device identifiers of the video devices may be obtained by performing encoding by using a target protocol.

Optionally, the target protocol may be a national standard protocol such as a GB28181 protocol, or the target protocol may be other types of protocols. Specific protocol types of the target protocol are not limited in the present disclosure. In addition, the device identifiers of the first servers and the second servers may be obtained by performing encoding by using the target protocol such as the national standard protocol.

The national standard protocol involves technical requirements for information transmission, switch and control in a video-surveillance-networking system for public security, and is a standard protocol for managing video devices, which specifies some common management interface standards for the video devices. Various video devices generally support the common standards in the national standard protocol, so that a device identifier of each video device can be identified by other devices.

By adopting the target protocol to uniformly encode the device identifiers of the devices included in the device control system, protocols used for communication between the devices included in the device control system may be unified, so that different devices from different manufacturers may be controlled by using instructions included in the same protocol, avoiding targeted and exceptional development, and saving development time and expenses.

In some embodiments, the device identifiers of the video devices may be configured by a related technical person through a configuration page. That is, the device identifiers of the video devices included in the device control system may be uniformly encoded through the configuration page. The configuration page may be provided by a terminal device through a visual interface. The terminal device may be a desktop computer, a portable computer, a smartphone, a tablet computer, etc. The terminal device displays the configuration page on the visual interface. The related technical person may configure the device identifiers of the video devices on the configuration page.

In a possible scenario, if there is a new video device to be connected to the device control system, the related technical person may configure a device identifier for the video device and first servers to be connected to the video device through the configuration page provided by the visual interface of the terminal device, so that the video device may be registered on the corresponding first servers based on the configured device identifier.

FIG. 3 is a schematic diagram illustrating a configuration page according to an embodiment of the present disclosure. The configuration page shown in FIG. 3 adopts a national standard protocol GB28181 as a target protocol. Specifically, a version of the adopted protocol is GB/T28181-2016. Through the configuration page shown in FIG. 3, a device identifier (i.e., username authentication ID) of a video device may be set to 33020000001320000000, a username of the video device may be set to 33020000001320000000, a password of the video device may be set to 12345, and a channel encoding ID of the video device may be set to 33020000001320000001. Moreover, a first server to be connected to the video device may be set through the configuration page. For example, through the configuration page shown in the FIG. 3, a device identifier (ID) of the first server (i.e., SIP server) to be connected to the video device may be set to 11011500492000000002, and an address of the SIP server may be set to 10.10.86.125, so that the video device may be registered on the corresponding first server based on the configuration information set on the configuration page.

It should be noted that, after the device configuration is completed through the configuration page, a terminal device may send the device identifier and the like configured through the configuration page to the corresponding video device, so that the video device may acquire the device identifier encoded by using the target protocol, and subsequently the video device may be registered on the first server based on the acquired device identifier.

For example, after the video device configuration is completed through the configuration page shown in FIG. 3, the terminal device may send the device identifier and the like configured through the configuration page to the corresponding device. The video device, after being started, may actively send a registration request to a designated first server (i.e., the SIP server set on the configuration page) through the target protocol (i.e., the national standard protocol GB28181), where the registration request may carry the device information set on the configuration page, such as the device identifier of the video device, a device IP address, device manufacturer information, a username and a password, and channel information.

The first server that receives the registration request may store the device information carried in the registration request. For example, the device information may be stored in a table mode in a device related table maintained by the first server, so as to achieve the registration of the video device. FIG. 4 is a schematic diagram illustrating a mode of storing device information according to an embodiment of the present disclosure. Through a device related table shown in FIG. 4, the storage of device information of a video device may be achieved. Information stored in the device related table includes, but is not limited to, a device identifier, a device name, a device manufacturer, a device default port, an online state, a registration time, an IP address, a device username, and a device password.

The device related table may be stored in a database. For example, the device related table may be stored in a first database. Each first server and each second server may access the device related table in the first database, so that related device information of the video device may be acquired based on the device identifier.

The above is only an exemplary mode of storing the device information. In more possible implementation manners, other modes may be adopted to store the device information. Specific modes to be adopted are not limited in the present disclosure.

Optionally, if there is a higher level first server of a first server that receives device information, the first server, after receiving the device information, may report a device identifier in the received device information to the higher level first server, or, after the storage of the device information is completed, may report a device identifier in the device information to the higher level first server. The higher level first server, in response to receiving the device identifier reported by the lower level first server, may store the received device identifier and the server identifier of the lower level first server that reports the device identifier in association, so that the cross-level control over respective video devices may be achieved subsequently based on the stored device identifier and server identifier in association.

After the architecture of the system in the present disclosure is introduced, a device control method provided in the present disclosure will be described in detail below with reference to the embodiments provided in the specification.

FIG. 5 is a flowchart illustrating a device control method according to an embodiment of the present disclosure. The method is applied to a first server, and includes:

At step 501, in response to a recording plan creation instruction, a recording plan is generated, where the recording plan includes at least a device identifier of a video device for video recording, and the device identifier is globally unique.

Optionally, the recording plan creation instruction may be manually triggered by a related technical person through a terminal device. The recording plan creation instruction carries at least the device identifier of the video device for video recording, so that the first server, in a case of receiving the recording plan creation instruction, may generate the recording plan based on contents carried in the received recording plan creation instruction.

At step 502, the recording plan is stored.

At step 503, in a case where recording conditions of a stored target recording plan are met, a second server is controlled to perform video recording through a target port in a target video device, where the target video device is a video device indicated by the device identifier in the target recording plan.

According to the present disclosure, in response to the recording plan creation instruction, the recording plan that includes at least the device identifier of the video device for video recording is generated, and the generated recording plan is stored; since the device identifier of the video device is globally unique, in a case where the recording conditions of the stored target recording plan are met, the second server is controlled to interact with the target video device indicated by the device identifier in the target recording plan and perform video recording through the target port in the target video device, making it more convenient and flexible to control the video device to perform recording.

In addition, the first server generates and stores the recording plan, so that the first server may uniformly manage a recording process. Only by setting corresponding recording conditions for each recording plan, the first server, in a case where the recording conditions are met, may start the corresponding video recording process. Therefore, requirements for uniform management can be satisfied, and the related technical person, in a case where the recording conditions are met, does not need to manually start the video recording process through the first server, which improves device control efficiency, simplifies manual control operations required in the recording process, and improves recording efficiency.

After the basic implementation process of the present disclosure is introduced, non-limiting embodiments of the present disclosure will be introduced in detail below.

In some embodiments, a recording plan creation page may be provided to a related technical person through a visual interface of a terminal device. The related technical person may fill related information of a recording plan to be created on the recording plan creation page, and after filling the information, send a recording plan creation instruction carrying the information filled on the recording plan creation page to a first server, so that the first server may generate the recording plan based on the received recording plan creation instruction.

It should be noted that the above is only an exemplary mode of triggering the recording plan creation instruction. In more possible implementation manners, other modes may be adopted to trigger the recording plan creation instruction. Specific modes to be adopted to trigger the recording plan creation instruction are not limited in the present disclosure.

In some embodiments, the first server may include an interface module, and the interface module may include a recording plan creation interface. The first server, after receiving the recording plan creation instruction, may generate the recording plan through the recording plan creation interface.

Optionally, the first server may modify the created recording plan through the recording plan creation interface.

The information carried in the recording plan creation instruction may include a device identifier of a video device for video recording. Optionally, the information carried in the recording plan creation instruction may further include time information (such as a recording begin time, a recording end time, a recording date, a recording cycle, etc.), a plan name, a plan identifier, a channel identifier, a video retention time, a plan state, a recording state, etc., so that the first server may generate the recording plan based on the above mentioned information. Correspondingly, the recording plan may include the device identifier of the video device for video recording. Furthermore, the recording plan may further include time information (such as a recording begin time, a recording end time, a recording date, a recording cycle, etc.), a plan name, a plan identifier, a channel identifier, a video retention time, a plan state, a recording state, etc.

Optionally, the recording date may be expressed in a form of day of month (for example, the $24^{th}$ day of a month) or day of week (for example, Thursday), and the recording cycle may be a weekly plan or a monthly plan. For example, for a recording plan in which video recording will be performed from Mar. 24, 2022 to Mar. 26, 2022, the recording date of the recording plan may be from the $24^{th}$ day to the $26^{th}$ day, and the recording cycle thereof may be March. For example, for a recording plan in which video recording will be performed from every Thursday to Friday, the recording date of the recording plan may be from Thursday to Friday, and the recording cycle thereof may be weekly.

The plan state may be configured to indicate an execution state of a plan (such as a start and an end), and the recording state may indicate whether a video device is currently recording a video (such as being not recording, being recording, completing recording, and having deleted).

In some embodiments, the first server, after generating the recording plan through step 501, may store the generated recording plan through step 502.

Optionally, the first server may further include a business system. After the first server generates the recording plan through the interface module, the interface module may send the generated recording plan to the business system of the first server, and the business system stores the generated recording plan.

In a possible implementation manner, for step 502, when the recording plan is stored, the recording plan may be stored in a target database. The target database may be a database for storing multiple recording plans maintained by the first server.

Optionally, when the recording plan is stored through the target database, the recording plan may be stored in a table mode in the target database.

It should be noted that, since the recording plan may include multiple types of information, when the recording plan is stored in a table mode, different information may be stored through different tables.

Taking the recording plan that includes time information (such as a recording begin time, a recording end time, a recording date, and a recording cycle), a plan name, a plan identifier, a channel identifier, a video retention time, a plan state, and a recording state as an example, in a possible implementation manner, the plan name, the recording cycle, the device identifier, the channel identifier, the video retention time, the plan state, and the recording state of the recording plan may be stored through a first table; the plan identifier, the recording cycle, the recording date, the recording begin time, and the recording end time of different-date-recording plans included in the recording plan may be stored respectively through at least one second table. The first table may be referred to as a recording plan table (tb_record_plan), and the second table may be referred to as a recording plan detail table (tb_plan_calendar).

Taking the recording plan in which video recording is performed from Mar. 24, 2022 (Thursday) to Mar. 26, 2022 (Saturday) as an example, for the time information included in the recording plan, the recording begin time is 00:00:00, Mar. 24, 2022, the recording end time is 23:59:59, Mar. 26, 2022, the recording cycle is March, and the recording date is from the $24^{th}$ day to the $26^{th}$ day. Then, the plan name, the recording cycle (i.e., March), the device identifier, the channel identifier, the video retention time, the plan state, and the recording state of the recording plan may be stored through the first table; related information of the recording plan on the $24^{th}$ day, the $25^{th}$ day, and the $26^{th}$ day may be stored respectively through three second tables. Taking the second table configured to store the recording plan on the $24^{th}$ day as an example, the second table stores the plan identifier, the recording cycle (i.e., March), the recording date (i.e., the $24^{th}$ day), the recording begin time (i.e., 00:00:00), and the recording end time (i.e., 23:59:59).

The recording plan is stored through the first table and the second table. The first table may store some basic information of the recording plan, and this information may not be necessary in the process of controlling the video device to perform video recording. The second table stores the detailed recording plan on different recording dates, that is, the information stored in the second table is necessary in the process of controlling the video device to perform video recording, so that the targeted storage of different information may be achieved, and subsequently scanning may be performed directly based on the second table to determine at which times on different dates video recording needs to be performed. There is no need to scan unnecessary information, reducing the processing pressure of the server.

FIG. 6 is a schematic diagram illustrating a first table according to an embodiment of the present disclosure. Through the first table shown in FIG. 6, the storage of a plan name (i.e., plan_name), a recording cycle (i.e., plan_type), a device identifier (i.e., device_id), a channel identifier (i.e., channel_id), a video retention time (i.e., retention_time), a plan state (i.e., is_enable) and a recording state (i.e., rec_status) may be achieved. In addition, a primary key (i.e., id), a creation time (i.e., create_time), and an update time (i.e., update_time) of the first table may be stored through the first table.

FIG. 7 is a schematic diagram illustrating a second table according to an embodiment of the present disclosure. Through the second table shown in FIG. 7, the storage of a plan identifier (i.e., plan_id), a recording cycle (i.e., plan_type), a recording date (i.e., calendar), a recording begin time (i.e., begin_time), and a recording end time (i.e., end_time) of a recording plan on any day may be achieved. In addition, a primary key (i.e., id), a creation time (i.e., create_time), and an update time (i.e., update_time) of the second table may be stored through the second table.

FIGS. 6 and 7 show only exemplary modes of the first table and the second table. In more possible implementation manners, more or less information may be stored in the first table and the second table, which is not limited in the present disclosure.

It should be noted that the first server may be composed of N-level servers, and the processes of generating and storing the recording plan may be executed by the $N^{th}$ level first server.

The above is an introduction to creating the recording plan through the terminal device and storing the recording plan through the first server. In more possible implementation manners, the terminal device may provide a recording plan edition interface to the related technical person, and the related technical person may edit the stored recording plan through the recording plan edition interface, for example, modify or delete the stored recording plan.

In some embodiments, in response to an edition operation of the related technical person on the recording plan edition interface, the terminal device may generate a recording plan edition instruction, and then send the generated recording plan edition instruction to the first server. The recording plan edition instruction may carry a plan identifier of a recording plan to be edited and many kinds of information to be edited. In response to receiving the recording plan edition instruction, the first server modifies information of the recording plan indicated by the plan identifier according to the plan identifier carried in the recording plan edition instruction, for example, replaces the stored corresponding information with many kinds of information to be edited in the stored recording plan, so as to achieve the edition of the stored recording plan.

The terminal device provides the recording plan edition interface, so that the related technical person may timely adjust the created recording plan according to actual needs, improving the flexibility of the video recording process.

The first server, after storing the recording plan according to the above embodiment, may detect the stored recording plan. In a case where the recording conditions of the target recording plan are met, the first server may perform video recording through the target video device indicated by the device identifier in the target recording plan in step 503. The target recording plan may be any stored recording plan.

In some embodiments, the $N^{th}$ level first server may detect the stored recording plan. In a case where the recording conditions of the stored target recording plan are met, the $N^{th}$ level first server determines the first level first server corresponding to the target video device and the higher level server corresponding to the first level first server; and the $N^{th}$ level first server controls the first level first server through the higher level server of the first level first server, so that the first level first server controls the second server corresponding to the target video device to perform video recording through the target port.

In some embodiments, the business system included in the first server may include a task scheduling unit. Therefore, the $N^{th}$ level first server may detect whether the stored recording plan meets the recording conditions through the task scheduling unit.

The recording conditions may include recording begin conditions and recording end conditions. Therefore, for step 503, in a case where the recording conditions of the stored target recording plan are met, controlling the second server to perform video recording through the target port in the target video device may include any one of the following situations:

In a possible situation, in a case where the recording begin conditions are met, the second server is controlled to acquire videos recorded by the target video device through the target port.

In another possible situation, in a case where the recording end conditions are met, the second server is controlled to stop acquiring the videos recorded by the target video device through the target port.

The two control processes will be respectively introduced below. Firstly, the process of, in a case where the recording begin conditions are met, controlling the second server to acquire the videos recorded by the target video device through the target port will be introduced.

The recording begin conditions may include arriving a recording begin time of the target recording plan. In a possible implementation manner, the first server may detect a recording begin time of each recording plan stored in the target database. For example, the $N^{th}$ level first server may detect the recording begin time of each recording plan stored in the target database through the task scheduling unit in the business system.

In a possible implementation manner, the $N^{th}$ level first server may detect the recording begin time of each recording plan stored in the target database in real time.

The first server detects the recording begin time of each recording plan stored in the target database in real time, so that the first server may timely discover a recording plan that needs to be executed, and then control a corresponding video device to perform video recording, ensuring the timeliness and accuracy of the video recording process.

In some embodiments, in a case where the recording begin conditions are met, controlling the second server to acquire the videos recorded by the target video device through the target port may be implemented in the following manners.

In a case where the recording begin conditions are met, the target port is enabled on the target video device; a port number of the target port, as well as a device identifier and an IP address of the target video device are sent to the second server; and the second server is configured to acquire the videos recorded by the target video device from the target port of the target video device based on the device identifier and the IP address.

In a possible implementation manner, in a case where the recording begin time of the target recording plan is arrived, the $N^{th}$ level first server may enable the target port of the target video device, and further send the port number of the target port, as well as the device identifier and the IP address of the target video device to the second server, so that the second server may acquire the videos recorded by the target video device from the target port of the target video device based on the device identifier and the IP address.

It should be noted that, when the port number of the target port, as well as the device identifier and the IP address of the target video device are sent to the second server, in a case where the $N^{th}$ level first server is connected to the second server through multi-level first servers, the $N^{th}$ level first server may send the port number of the target port, as well as the device identifier and the IP address of the target video device, level by level, down to the first server at each level, and further the first server directly connected to the second server sends the port number of the target port, as well as the device identifier and the IP address of the target video device to the second server.

A process of enabling the target port of the target video device may be implemented in the following manners.

A port number is generated for the target recording plan; a port enabling instruction is sent to the target video device, where the port enabling instruction carries the port number; and the target video device is configured to, in response to the port enabling instruction, enable the target port corresponding to the port number on the target video device.

In a possible implementation manner, the first server further includes a signaling module. The first server may generate the port number for the target recording plan through the business system, and send the generated port number to the signaling module, so as to send the port enabling instruction to the target video device through the signaling module. Optionally, the first server may randomly generate a port number (which may be any port number in a port number range of 30000 to 30500) through the business system, and the generated port number is specially configured for the task execution of the target recording plan.

Optionally, when the port enabling instruction is sent to the target video device, an instruction set of the target protocol may be adopted to send the port enabling instruction to the target video device.

After the target video device enables the target port, the second server corresponding to the target video device may acquire the videos collected by the target video device through the target port. The videos collected by the target video device are real-time video streams. Therefore, the videos acquired by the second server through the target port are real-time video streams.

In a possible implementation manner, the business system of the first server may generate a video stream identifier (i.e., video stream ID) for the target recording plan, and send the video stream identifier, the server identifier of the second server, and the port number generated for the target recording plan through the above process to the signaling module, so that the first server may acquire a video stream from the target port enabled on the target video device based on the port number by using the second server indicated by the server identifier through the signaling module, and use the video stream ID generated by the business system as the identifier of the acquired video stream. The video stream ID may be a character string with a certain length.

It should be noted that a corresponding relationship between each video device and the second server may be preset when the video device is registered, and the relationship between the second server and video devices may be a one-to-many relationship. Therefore, the first server may control the second server corresponding to the target video device to pull the video stream based on the preset corresponding relationship.

Optionally, the second server, in a case of receiving a video stream pushed by the video device, may record videos based on the received video stream, transcode the recorded videos to convert a format of the video stream into a format that can be stored, and then store the transcoded videos.

In some embodiments, in a case where the recording begin conditions are met, the first server may create a log record for the target recording plan, where the log record includes at least the video stream identifier of the videos corresponding to the target recording plan. Optionally, the log record may further include the device identifier of the target video device, the recording begin time, the recording end time, the recording state, etc.

Optionally, the first server may generate a recording log table for the target recording plan, so as to implement the log record through the recording log table.

FIG. 8 is a schematic diagram illustrating a recording log table according to an embodiment of the present disclosure. Through the recording log table shown in FIG. 8, the log record for a process of executing the target recording plan may be implemented. Specifically, a plan identifier (i.e., plan_id), a plan detail identifier (i.e., calendar_id), a device identifier (i.e., device_id), a channel identifier (i.e., channel_id), a video stream identifier (i.e., stream_id), a recording begin time (i.e., begin_time), a recording end time (i.e., end_time), a recording state (i.e., rec_status), and a server identifier (i.e., media_server_id) of the second server configured to pull the video stream from the video device may be stored through the recording log table shown in FIG. 8. In addition, a primary key (i.e., id), a creation time (i.e., create_time), and an update time (i.e., update_time) of the recording log table may be stored through the recording log table.

By creating the log record for the recording plan that is being executed, an execution state of the target recording plan may be recorded in real time, enabling the related technical person to view the execution state of the target recording plan through the log record, which facilitates management. Moreover, each recording plan has its corresponding log record, allowing users to easily monitor the execution state of each recording plan, which achieves the refined management of the video recording process, and helps to view and manage the state of single recording.

The recording log table may be stored in a database. For example, the recording log table may be stored in a second database. Each first server and second server may access the recording log table in the second database, so that each first server and second server may acquire the log record of each recording plan.

Optionally, different access permissions may be set for the recording log table stored in the second database. For example, each recording log table may be accessed only by a first server and a second server directly or indirectly connected to a video device in a corresponding recording plan, improving the information security of the device control system.

In some embodiments, the first server may further include a monitor module, so as to acquire the log record from the recording log table through the monitor module, and send the acquired log record to the terminal device, so that the terminal device may display the received log record.

Optionally, the terminal device may provide a log view interface, so as to display the acquired log record through the log view interface provided by the terminal device.

For example, the first server may acquire the recording state from the recording log table through the monitor module, and send the acquired recording state to the terminal device, so that the terminal device may display the received recording state through the log view interface, enabling the related technical person to intuitively learn a current recording state of the recording plan.

FIG. 9 is a flowchart illustrating a recording begin process according to an embodiment of the present disclosure. As shown in FIG. 9, a first server may include an interface module, a business system, and a signaling module, where the business system may include a task scheduling unit. In a possible implementation manner, a recording plan may be created through the interface module of the first server; the created recording plan is sent to the business system of the first server through the interface module; and the recording plan is stored through the business system, where the business system includes the task scheduling unit. The business system may periodically perform task scheduling through the task scheduling unit to detect whether there is a recording plan that meets recording start conditions, in a case where a target recording plan meets the recording begin conditions, create a recording begin task, and request a video device to push a video stream through the signaling module. The video device may send a recorded video stream to a second server. The signaling module of the first server may send a recording begin event to the second server, so that the second server, in response to receiving the recording begin event, may record videos based on the received video stream from the video device, transcode and store the recorded videos.

According to the present disclosure, by creating a recording plan and controlling a video device to perform video recording based on a recording begin time of each recording plan, multiple video devices may be controlled to perform video recording. For example, at 10:00 to 11:00, if two recording plans arrive their recording begin times, a first server may use a second server corresponding to a target video device in each of the two recording plans to control the corresponding target video device to perform video recording. A process of controlling each target video device to perform video recording is the same as the above process, which will not be repeated here.

Moreover, since each time of video recording needs to newly add one-channel stream to perform the video recording task, the solutions provided in the present disclosure may support a single camera to perform multiple video recording tasks simultaneously, and video streams corresponding to different video recording tasks are isolated from each other, and do not affect each other.

The above is only an introduction to the recording begin process. A process of, in a case where the recording end conditions are met, controlling the second server to stop acquiring the videos recorded by the target video device through the target port will be introduced below.

In some embodiments, in a case where the recording end conditions are met, the first server may send a recording stop instruction to the second server. The recording stop instruction may carry the video stream identifier, so that the second server may determine which video stream recording needs to be stopped based on the received video stream identifier.

The recording end conditions may include arriving a recording end time. That is, the first server, in a case where the recording end time is arrived, may send the recording stop instruction to the second server.

It should be noted that the first server may detect the recording end time of the target recording plan that is being executed. For example, the $N^{th}$ level first server may detect the recording end time of the target recording plan that is being executed. Optionally, the first server may detect the recording end time of the target recording plan that is being executed through the task scheduling unit in the business system.

For example, the first server may detect the recording end time of the target recording plan that is being executed in real time through the task scheduling unit in the business system, so as to ensure that, in a case where the recording end time of the target recording plan is arrived, the first server may timely discover, timely stopping the execution of the target recording plan.

In a possible implementation manner, the first server, in a case of detecting that the recording end time of the target recording plan has been arrived through the business system, may send the video stream identifier corresponding to the target recording plan and the server identifier of the second server to the signaling module, and send the recording stop instruction carrying the video stream identifier to the second server through the signaling module.

It should be noted that, when the recording stop instruction is sent to the second server, in a case where the $N^{th}$ level first server is connected to the second server through multi-level first servers, the $N^{th}$ level first server may send the recording stop instruction, level by level, down to the first server at each level, and then send the recording stop instruction to the second server through the first server directly connected to the second server.

Optionally, the second server, in response to receiving the recording stop instruction, may stop acquiring the video stream from the target port of the target video device. The video device may stop pushing the video stream to the second server. The second server may end this video recording task, and feed file information (such as file addresses, sizes, durations) of video files stored by the second server and the video stream identifier back to the business system. The business system, after receiving the file information of the video files, may acquire the video files from the second server, and store the acquired video files. Optionally, the recorded videos may be stored through a hard disk of a third server (for example, a file server) to obtain the video files. Alternatively, the recorded videos may be stored through cloud storage to obtain the video files.

In the present disclosure, each second server may be associated with one file server or cloud storage, so that the video files may be stored through the file server or the cloud storage. After the completion of storage, only file storage addresses need to be reported to the first server that initiates the video recording task. Users may view the stored video files anytime and anywhere through the file storage addresses in the first server. Optionally, users may select different storage manners according to actual application environments. Specific storage manners to be adopted are not limited in the present disclosure. In addition, the stored video files may be in various formats. For example, the video files may be in a format of Moving Picture Experts Group 4 (MP4), Flash Video (FLV), HTTP Live Streaming (HLS), etc. Specific video file formats are not limited in the present disclosure.

In addition, the first server may set the recording state in the log record to "recording completion" state, and generate a file record for the stored video files.

Optionally, the generated file record may be maintained through a video file table. FIG. 10 is a schematic diagram illustrating a video file table according to an embodiment of the present disclosure. Through the video file table shown in FIG. 10, the storage of related information of the video files may be implemented. Specifically, a recording log identifier (i.e., reg_log_id), a device identifier (i.e., device_id), a channel identifier (i.e., channel_id), a video stream identifier (i.e., stream_id), a video file address (i.e., rec_src), an expiration time (i.e., expire_time), a recording begin time (i.e., begin_time), and a recording end time (i.e., end_time) may be stored through the video file table shown in FIG. 10. In addition, a primary key (i.e., id), a creation time (i.e., create_time), and an update time (i.e., update_time) of the video file table may be stored through the video file table.

The video file table may be stored in a database. For example, the video file table may be stored in a third database. Each first server and second server may access the video file table in the third database, so that each first server and second server may acquire the video files recorded based on each recording plan.

In addition, the third database may be accessed by the terminal device, so that the related technical person may acquire the video files through the terminal device, and then play the video files through the terminal device, which enables the related technical person to view the video files through the visual interface of the terminal device.

Figure 11:
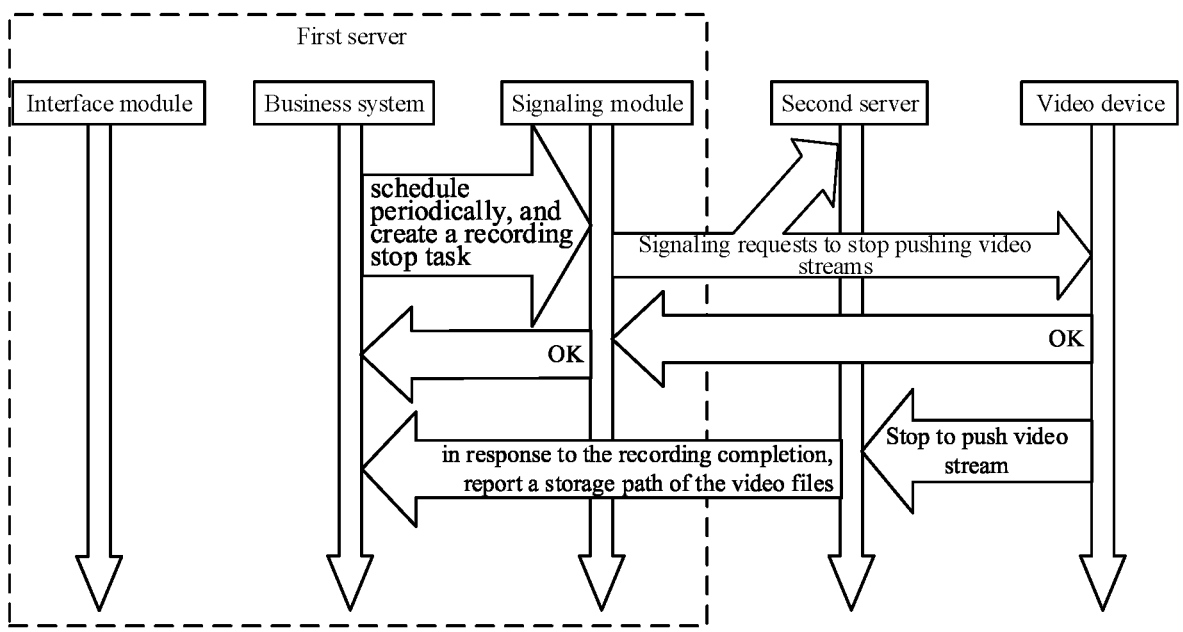
FIG. 11 is a flowchart illustrating a recording stop process according to an embodiment of the present disclosure.

FIG. 11 is a flowchart illustrating a recording stop process according to an embodiment of the present disclosure. As shown in FIG. 11, task scheduling may be periodically performed through the task scheduling unit included in the business system of the first server to detect whether there is a video recording task that needs to be stopped, so that, in a case where there is a video recording task that needs to be stopped, the second server and the video device may be requested to stop pushing video streams. The video device, in response to receiving the request to stop pushing the video streams, stops pushing the video streams to the second server. The video recording process is completed. The second server, in response to the recording completion, may report a storage path of the recorded video files to the business system of the first server, so that the first server may acquire the video files from a corresponding storage location based on the received storage path.

In some embodiments, the first server may detect expiration times of the stored video files, and, in a case where the expiration time of any one of the video files is arrived, delete the expired video file.

By detecting the expiration times of the video files, the expired video file may be timely discovered, so that the expired video file may be timely deleted, avoiding that the expired video file occupies storage space to cause the waste of storage resources.

Figure 12:
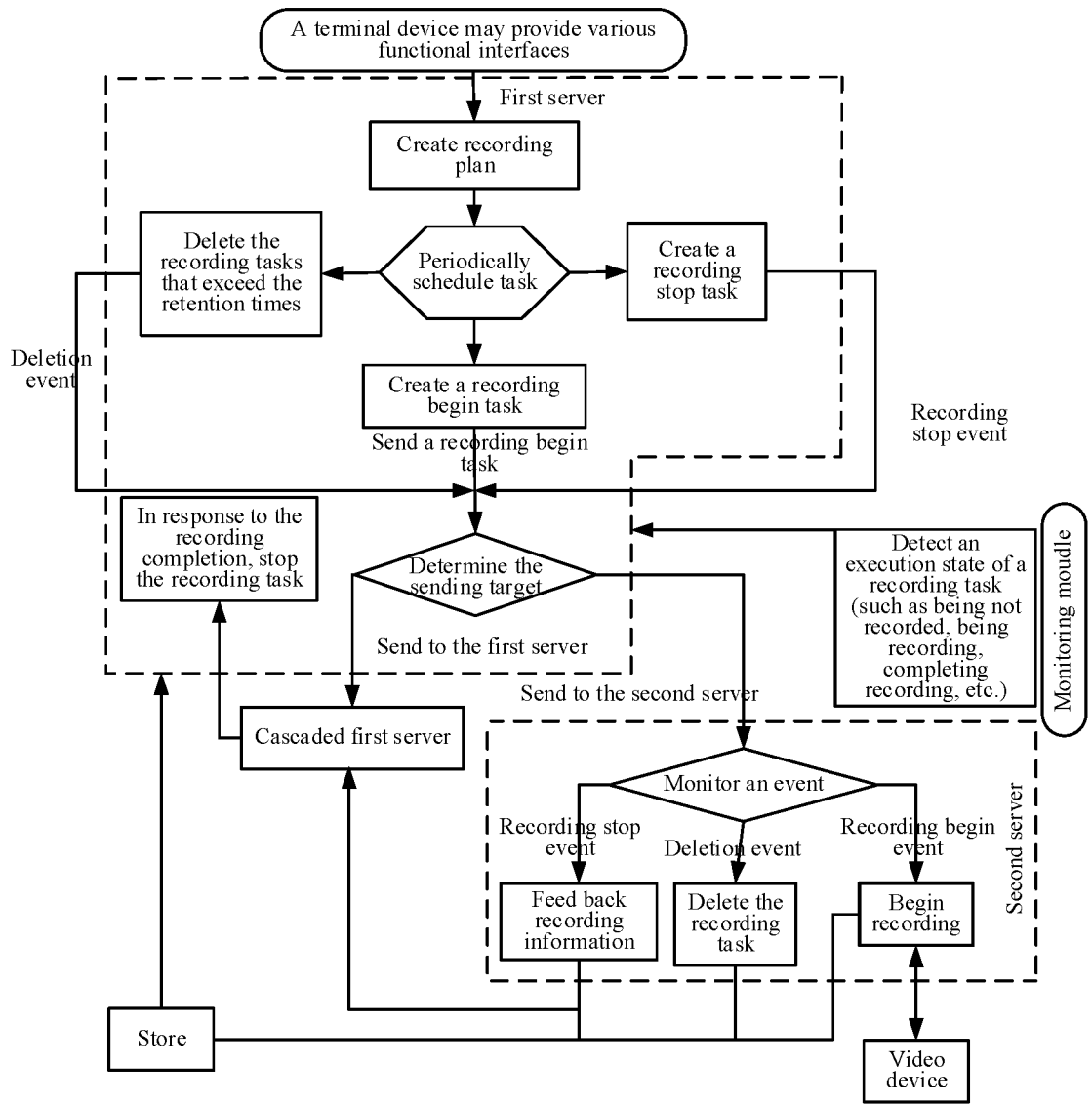
FIG. 12 is a flowchart illustrating a device control method according to an embodiment of the present disclosure.

For the device control method provided in the above embodiments, reference may be made to FIG. 12. FIG. 12 is a flowchart illustrating a device control method according to an embodiment of the present disclosure. As shown in FIG. 12, a terminal device may provide various functional interfaces, such as a recording plan creation interface, a recording plan edition interface, and a log view interface, so that a related technical person may perform corresponding operations through different interfaces, such as control a first server to create a recording plan through the recording plan creation interface, edit a stored recording plan through the recording plan edition interface, and view a log record of a recording plan through the log view interface.

It should be noted that the first server, after storing the created recording plan, may periodically perform task scheduling to control a recording begin process, a recording stop process, and a recording deletion process. The three processes will be introduced below respectively.

For the recording begin process, a first server may create a recording begin task through a periodical task scheduling module, and send the recording begin task to a corresponding first server. The first server controls a video device to record videos through a second server. The second server may monitor events sent from the first server in real time, so as to control the video device to record the videos and store the recorded videos in a case of monitoring a recording begin event.

For the recording stop process, a first server may create a recording stop task through a periodical task scheduling module, and send the recording stop task to a corresponding first server. The first server controls a video recording process to stop through a second server. The second server may monitor events sent from the first server in real time, so as to feed recording information back to a cascaded first server in a case of monitoring a recording stop event, which allows the cascaded first server to determine the completion of recording based on the received recording information. Thereby, the video recording task may be ended.

For the recording deletion process, a first server may create a recording deletion task through a periodical task scheduling module. The recording deletion task is configured to delete video recording tasks that exceed retention times. The first server may send the recording deletion task to a corresponding first server. The first server may delete the recording tasks that exceed the retention times through a second server. The second server may monitor events sent from the first server in real time, so as to delete the video recording tasks that exceed the retention times in a case of monitoring a recording deletion event.

Optionally, the first server may acquire a log record corresponding to each recording plan through a monitor module, for example, detect an execution state of a video recording task (such as being not recording, being recording, completing recording, etc.) through the monitor module. Further, the monitor module may send the log record (for example, the execution state of the video recording task) to the terminal device, so that the terminal device may display the log record through the log view interface.

FIG. 12 shows only a procedural introduction to the present disclosure. For the specific implementation process of the present disclosure, reference may be made to the above embodiments, which will not be repeated here.

Corresponding to the embodiments of the method, the present disclosure further provides embodiments of a corresponding device control apparatus and its applied server.

Figure 13:
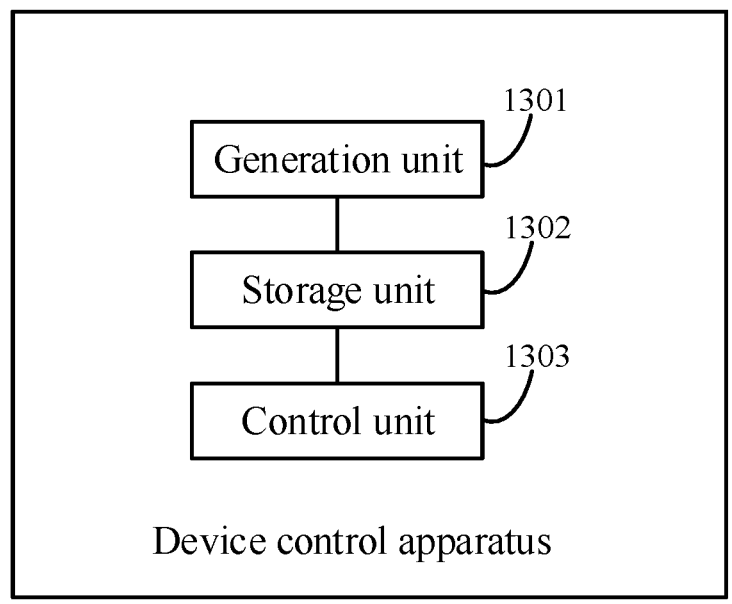
FIG. 13 is a block diagram illustrating a data processing apparatus according to an embodiment of the present disclosure.

FIG. 13 is a block diagram illustrating a data processing apparatus according to an embodiment of the present disclosure. The apparatus includes:

a generation unit 1301, configured to, in response to a recording plan creation instruction, generate a recording plan, where the recording plan includes at least a device identifier of a video device for video recording, and the device identifier is globally unique;

a storage unit 1302, configured to store the recording plan;

a control unit 1303, configured to, in a case where recording conditions of a stored target recording plan are met, control a second server to perform video recording through a target port in a target video device, where the target video device is a video device indicated by a device identifier in the target recording plan.

In some embodiments, the first server is composed of N-level servers.

the control unit 1303, when, in a case where the recording conditions of the stored target recording plan are met, controlling the second server to perform video recording through the target port in the target video device, is configured to:

in a case where the recording conditions of the stored target recording plan are met, determine a first level first server corresponding to the target video device and a higher level server corresponding to the first level first server;

control the first level first server through the higher level server of the first level first server, so that the first level first server controls a second server corresponding to the target video device to perform video recording through the target port.

In some embodiments, the recording conditions include recording begin conditions and recording end conditions;
the control unit 1303, when, in a case where the recording conditions of the stored target recording plan are met, controlling the second server to perform video recording through the target port in the target video device, includes a first control sub-unit and a second control sub-unit, where
the first control sub-unit is configured to, in a case where the recording begin conditions are met, control the second server to acquire videos recorded by the target video device through the target port;
the second control sub-unit is configured to, in a case where the recording end conditions are met, control the second server to stop acquiring the videos recorded by the target video device through the target port.

In some embodiments, the first control sub-unit, when, in a case where the recording begin conditions are met, controlling the second server to acquire the videos recorded by the target video device through the target port, is configured to:
in a case where the recording begin conditions are met, enable the target port of the target video device;
send a port number of the target port, as well as a device identifier and an Internet Protocol IP address of the target video device to the second server, where the second server is configured to acquire the videos recorded by the target video device from the target port of the target video device based on the device identifier and the IP address.

In some embodiments, the recording plan further includes time information, and the time information includes a recording begin time;
the first control sub-unit, when, in a case where the recording begin conditions are met, enabling the target port of the target video device, is configured to:
in a case where a recording begin time of the target recording plan is arrived, enable the target port of the target video device.

In some embodiments, the storage unit 1302, when storing the recording plan, is configured to:
storing the recording plan in a target database;
the apparatus further includes:
a detection unit, configured to detect a recording begin time of each recording plan stored in the target database.

In some embodiments, the storage unit 1302, when storing the recording plan in the target database, is configured to:
store the recording plan in a table mode in the target database.

In some embodiments, the time information further includes a recording date and a recording cycle, and the recording plan further includes a plan name, a plan identifier, a channel identifier, a video retention time, a plan state, and a recording state;
the storing unit 1302, when storing the recording plan in the table mode in the target database, is configured to:
store the plan name, the recording cycle, the device identifier, the channel identifier, the video retention time, the plan state, and the recording state of the recording plan through a first table;
store the plan identifier, the recording cycle, the recording date, the recording begin time, and a recording end time of different-date-recording plans included in the recording plan respectively through at least one second table.

In some embodiments, the first control sub-unit, when enabling the target port of the target video device, is configured to:
generate a port number for the target recording plan;
send a port enabling instruction to the target video device, where the port enabling instruction carries the port number, and the target video device is configured to, in response to the port enabling instruction, enable a target port corresponding to the port number on the target video device.

In some embodiments, the device identifier is obtained by performing encoding by using a target protocol;
the first control sub-unit, when sending the port enabling instruction to the target video device, is configured to:
send the port enabling instruction to the target video device by using an instruction set of the target protocol.

In some embodiments, the apparatus further includes:
a creation unit, configured to, in a case where the recording begin conditions are met, create a log record for the target recording plan, where the log record includes at least a video stream identifier of videos corresponding to the target recording plan.

In some embodiments, the second control sub-unit, when, in a case where the recording end conditions are met, controlling the second server to stop acquiring the videos recorded by the target video device through the target port, is configured to:
in a case where the recording end conditions are met, send a recording stop instruction to the second server, where the recording stop instruction carries the video stream identifier.

In some embodiments, the recording plan further includes time information, and the time information includes a recording end time;
the second control sub-unit, when, in a case where the recording end conditions are met, sending the recording stop instruction to the second server, is configured to:
in a case where the recording end time is arrived, send the recording stop instruction to the second server.

In some embodiments, the storage unit 1302 is further configured to store the recorded videos through a hard disk of a third server to obtain video files;
the storage unit 1302 is further configured to store the recorded videos through cloud storage to obtain video files.

In some embodiments, the recording plan further includes expiration times of the video files;
the apparatus further includes:
a deletion unit, configured to, in a case where the expiration times of the video files are arrived, delete expired video files.

For detailed implementation processes of functions and roles of respective units or sub-units in the apparatus, reference may be made to implementation processes of corresponding steps in the method, which will not be repeated here.

For the apparatus embodiments, since the apparatus embodiments basically correspond to the method examples, reference may be made to the partial description of the method embodiments. The apparatus embodiments described above are merely illustrative, where the units or sub-units described as separate components may or may not be physically separated, and the components displayed as units or sub-units may or may not be physical units, i.e., may be located in one place or may be distributed to multiple network modules. Some or all of the units or sub-units may be selected according to actual needs to achieve the objectives of this specification. Those of ordinary skill in the art can understand and implement the present disclosure without any creative effort.

Figure 14:
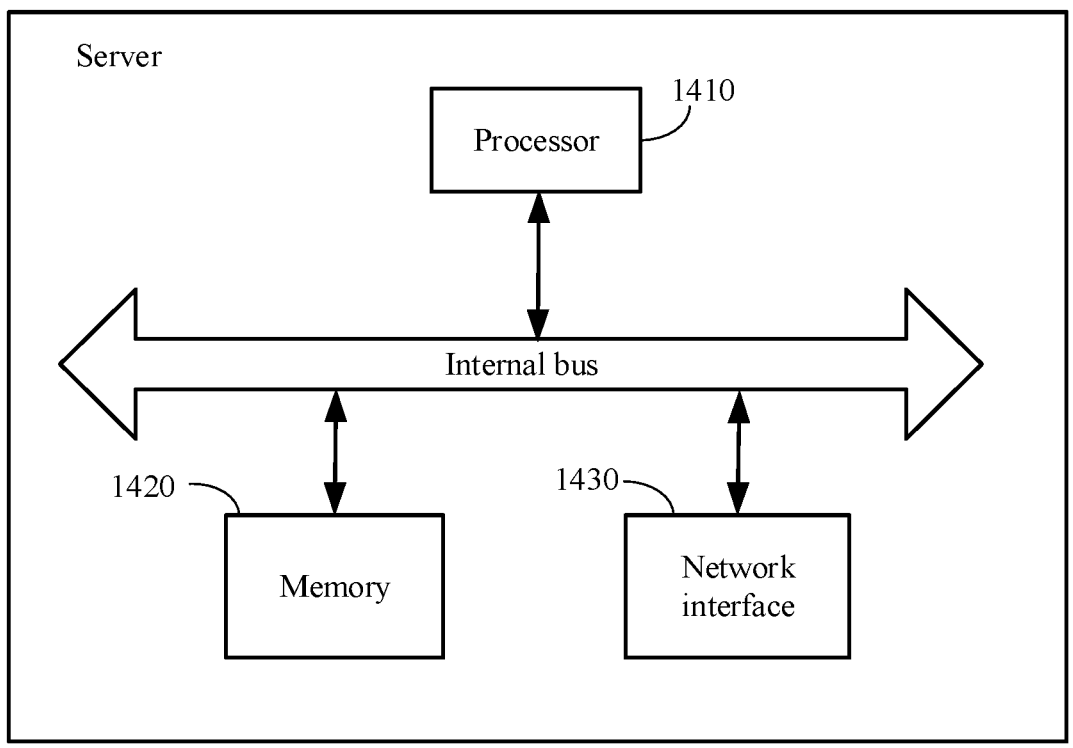
FIG. 14 is a structural schematic diagram illustrating a computing device according to an embodiment of the present disclosure.

The present disclosure further provides a server. FIG. 14 is a structural schematic diagram illustrating a computing device according to an embodiment of the present disclosure. As shown in FIG. 14, the computing device includes a processor 1410, a memory 1420, and a network interface 1430. The memory 1420 is used to store computer instructions that can be run on the processor 1410. The processor 1410 is used to implement the device control method provided in any embodiment of the present disclosure when executing the computer instructions. The network interface 1430 is used to implement input and output functions. In more possible implementation manners, the server may further include other hardware, which is not limited in the present disclosure.

The present disclosure further provides a computer readable storage medium, which can be in various forms. For example, in different examples, the computer readable storage medium can be: a Radom Access Memory (RAM), a volatile memory, a non-volatile memory, a flash memory, a storage drive (such as a hard disk drive), a solid state hard disk, any type of storage disk (such as an optical disk or a DVD), or a similar storage medium, or a combination thereof. In particular, the computer readable medium can be paper or other suitable medium capable of printing programs. A computer program is stored on the computer readable storage medium, and the computer program is executed by a processor to implement the device control method provided by any embodiment of the present disclosure.

The present disclosure further provides a computer program product, including a computer program, where the computer program is executed by a processor to implement the device control method provided by any embodiment of the present disclosure.

Those skilled in the art should understand that one or more embodiments of this specification may be provided as methods, apparatuses, computing devices, computer readable storage media, or computer program products. Accordingly, one or more embodiments of this specification may take the form of pure hardware embodiments, pure software embodiments, or embodiments combining software and hardware aspects. Furthermore, one or more embodiments of this specification may take the form of computer program products implemented on one or more computer usable storage media (including, but not limited to, disk storage, Compact Disc Read-Only Memories (CD-ROMs), optical storage, etc.) having computer usable program codes therein.

Various examples in this specification are described in a progressive manner. Same or similar parts in the various embodiments may be referred to for each other, and each embodiment focuses on the differences from other embodiments. Especially, for the embodiments corresponding to the computing apparatus, since the apparatus embodiments are basically similar to the method embodiments, the description is simplified, and reference may be made to some of the description of the method embodiments.

Specific embodiments of this specification are described above. Other embodiments are within the scope of the present disclosure. In some cases, actions or steps recorded in the present disclosure can be performed in a sequence different from that in the embodiments and desired results can still be achieved. In addition, processes depicted in the drawings are not necessarily required to be performed in a shown particular or sequential order to achieve the desired results. In some embodiments, multi-task processing and parallel processing are possible or may be advantageous.

The embodiments of subject matters and functional operations described in this specification can be implemented in a digital electronic circuit, tangible computer software or firmware, computer hardware including structures and their structural equivalents disclosed in this specification, or a combination of one or more of them. The embodiments of the subject matters described in this specification can be implemented as one or more computer programs, that is, one or more modules in computer program instructions that are encoded on a tangible non-temporary program carrier so as to be executed by a device control apparatus or that control operations of the device control apparatus. Alternatively or additionally, program instructions can be encoded on artificially generated propagation signals, such as machine generated electrical, optical, or electromagnetic signals, which are generated to encode and transmit information to a suitable receiver apparatus for execution by the device control apparatus. The computer storage medium can be a machine readable storage device, a machine readable storage substrate, a random or serial access memory device, or a combination of one or more of them.

The processes and logic steps described in this specification can be executed by one or more programmable computers that execute one or more computer programs, so as to realize corresponding functions by operating according to input data and generating outputs. The processes and logic steps can be executed by a special logic circuit, such as Field Programmable Gate Array (FPGA) or Application Specific Integrated Circuit (ASIC), and the apparatus can be implemented as a special logic circuit.

Computers suitable for executing computer programs include, for example, general-purpose and/or dedicated microprocessors, or any other type of central processing unit. Typically, the central processing unit will receive instructions and data from Read-Only Memory (ROM) and/or Random-Access Memory (RAM). Basic components of a computer include a central processing unit for implementing or executing instructions and one or more memory devices for storing instructions and data. In general, the computer will further include one or more mass storage devices for storing data, such as a magnetic disk, a magneto-optical disk or an optical disk, or the computer will be operatively coupled with the mass storage devices to receive or transmit data therefrom or thereto, or both. However, the computer does not have to include such devices. In addition, the computer may be embedded in another device, such as a mobile phone, a personal digital assistant (PDA), a mobile audio or video player, a game console, a Global Positioning System (GPS) receiver, or a portable storage device (for example, a Universal Serial Bus (USB) flash drive), to name just a few.

Computer readable media suitable for storing computer program instructions and data includes all forms of non-volatile memory, medium, and memory device, such as semiconductor memory devices (such as EPROMs, EEPROMs, and flash memory devices), magnetic disks (such as internal hard disks or removable disks), magneto-optical disks, and CD-ROM and DVD-ROM disks. The processor and the memory may be supplemented by or incorporated into a special logic circuit.

Although this specification includes many specific implementation details, these, instead of being interpreted as limiting the scope of any disclosure or the claimed scope of protection, are mainly used to describe characteristics of specific embodiments of a particular disclosure. Some features described in multiple embodiments of this specification may be combined in a single embodiment. In another aspect, various features described in a single embodiment may be implemented separately in multiple embodiments or implemented in any suitable sub-combination. In addition, although features may take effect in some combinations as described above and be even initially so claimed, one or more features from the claimed combinations may be removed from the combinations in some cases, and the claimed combinations may point to sub-combinations or variants of the sub-combinations.

Similarly, although the operations are described in the drawings in a specific order, this should not be understood as requiring these operations to be performed in a shown particular or sequential order, or requiring all illustrated operations to be performed, so as to achieve desired results. In some cases, multi-task processing and parallel processing may be advantageous. In addition, separation of various system modules and components in the embodiments as described above should not be understood as that such separation is required in all embodiments, and it should be understood that the described program components and system can be generally integrated into a single software product or packaged into multiple software products.

Therefore, the specific embodiments of the subject matters have been described. Other embodiments are within the scope of the present disclosure. In some cases, actions described in the present disclosure may be performed in different orders and the desired results can still be achieved. Further, the processes depicted in the drawings are not necessarily required to be performed in a shown particular or sequential order to achieve the desired results. In some implementation manners, multi-task processing and parallel processing may be advantageous.

Other embodiments of this specification will be readily apparent to those skilled in the art after considering the specification and practicing the contents disclosed herein. This specification is intended to cover any variations, uses, or adaptations of this specification, which follow the general principle of this specification and include common knowledge or conventional technical means in the art that are not disclosed in this specification. That is, this specification is not limited to the precise structures that have described and shown in the drawings, and various modifications and changes can be made without departing from the scope thereof.

The above are only optional embodiments of this specification, which are not intended to limit the specification. Any modification, equivalent replacement, improvement, etc. made within the spirit and principle of the specification shall be included in the protection scope of the specification.

The invention claimed is:

1. A device control method, being applied to a first server, and comprising:
in response to a recording plan creation instruction, generating a recording plan, wherein the recording plan comprises a device identifier of a video device for video recording, and the device identifier is globally unique;
storing the recording plan; and
in a case where recording conditions of a stored target recording plan are met, controlling a second server to perform video recording through a target port in a target video device, wherein the target video device is a video device indicated by a device identifier in the target recording plan;
wherein the first server is composed of N-level servers, the N is an integer greater than or equal to 2, the N-level servers comprise first level first servers within at least two local area networks and an $N^{th}$ level first server, and a device identifier for each of the N-level servers is globally unique;
in a case where the recording conditions of the stored target recording plan are met, controlling the second server to perform video recording through the target port in the target video device comprises:
in a case where the recording conditions of the stored target recording plan are met, determining, by the $N^{th}$ level first server, a first level first server of the first level first servers corresponding to the target video device; and
controlling, by the $N^{th}$ level first server, the first level first server, so that the first level first server controls the second server corresponding to the target video device to perform video recording through the target port.

2. The method according to claim 1, when the N is an integer greater than or equal to 3, the N-level servers further comprise a higher level first server of the first level first server between the $N^{th}$ level first server and the first level first server;
in a case where the recording conditions of the stored target recording plan are met, controlling the second server to perform video recording through the target port in the target video device comprises:
in a case where the recording conditions of the stored target recording plan are met, determining, by the $N^{th}$ level first server, the first level first server corresponding to the target video device and the higher level first server corresponding to the first level first server; and
controlling, by the $N^{th}$ level first server, the first level first server through the higher level first server of the first level first server, so that the first level first server controls the second server corresponding to the target video device to perform video recording through the target port.

3. The method according to claim 1, wherein the recording conditions comprise recording begin conditions and recording end conditions;
in a case where the recording conditions of the stored target recording plan are met, controlling the second server to perform video recording through the target port in the target video device comprises:
in a case where the recording begin conditions are met, controlling the second server to acquire videos recorded by the target video device through the target port; and
in a case where the recording end conditions are met, controlling the second server to stop acquiring the videos recorded by the target video device through the target port.

4. The method according to claim 3, wherein, in a case where the recording begin conditions are met, controlling the second server to acquire the videos recorded by the target video device through the target port comprises:
in a case where the recording begin conditions are met, enabling the target port of the target video device; and sending a port number of the target port, as well as the device identifier and an Internet Protocol (IP) address of the target video device to the second server, wherein the second server is configured to acquire the videos recorded by the target video device from the target port of the target video device based on the device identifier and the IP address.

5. The method according to claim 4, wherein the recording plan further comprises time information, and the time information comprises a recording begin time;
in a case where the recording begin conditions are met, enabling the target port of the target video device comprises:
in a case where a recording begin time of the target recording plan is arrived, enabling the target port of the target video device.

6. The method according to claim 5, wherein storing the recording plan comprises:
storing the recording plan in a target database; and
before, in a case where the recording begin conditions are met, controlling the second server to acquire the videos recorded by the target video device through the target port, the method further comprises:
detecting a recording begin time of each recording plan stored in the target database.

7. The method according to claim 6, wherein storing the recording plan in the target database comprises:
storing the recording plan in a table mode in the target database.

8. The method according to claim 7, wherein the time information further comprises a recording date and a recording cycle, and the recording plan further comprises a plan name, a plan identifier, a channel identifier, a video retention time, a plan state, and a recording state;
storing the recording plan in the table mode in the target database comprises:
storing the plan name, the recording cycle, the device identifier, the channel identifier, the video retention time, the plan state, and the recording state of the recording plan through a first table; and
storing the plan identifier, the recording cycle, the recording date, the recording begin time, and a recording end time of different-date-recording plans comprised in the recording plan respectively through at least one second table.

9. The method according to claim 4, wherein enabling the target port of the target video device comprises:
generating a port number for the target recording plan; and
sending a port enabling instruction to the target video device, wherein the port enabling instruction carries the port number, and the target video device is configured to, in response to the port enabling instruction, enable a target port corresponding to the port number on the target video device.

10. The method according to claim 9, wherein the device identifier is obtained by performing encoding by using a target protocol;
sending the port enabling instruction to the target video device comprises:
sending the port enabling instruction to the target video device by using an instruction set of the target protocol.

11. The method according to claim 3, further comprising:
in a case where the recording begin conditions are met, creating a log record for the target recording plan, wherein the log record comprises a video stream identifier of videos corresponding to the target recording plan.

12. The method according to claim 11, wherein, in a case where the recording end conditions are met, controlling the second server to stop acquiring the videos recorded by the target video device through the target port comprises:
in a case where the recording end conditions are met, sending a recording stop instruction to the second server, wherein the recording stop instruction carries the video stream identifier.

13. The method according to claim 12, wherein the recording plan further comprises time information, and the time information comprises a recording end time;
in a case where the recording end conditions are met, sending the recording stop instruction to the second server comprises:
in a case where the recording end time is arrived, sending the recording stop instruction to the second server.

14. The method according to claim 12, wherein, after, in a case where the recording end conditions are met, sending the recording stop instruction to the second server, the method further comprises at least one of the followings:
storing the recorded videos through a hard disk of a third server to obtain video files; or
storing the recorded videos through cloud storage to obtain video files.

15. The method according to claim 14, wherein the recording plan further comprises expiration times of the video files;
the method further comprises:
in a case where the expiration times of the video files are arrived, deleting expired video files.

16. A server, comprising: a memory, a processor, and a computer program stored in the memory and capable of running on the processor, wherein the program is executed by the processor to perform operations in the device control method according to claim 1.

17. A device control system, comprising: a first server, a second server, and at least one video device, wherein,
the first server is configured to, in response to a recording plan creation instruction, generate and store a recording plan, wherein the recording plan comprises a device identifier of a video device for video recording, and the device identifier is globally unique;
the first server is further configured to control the at least one video device to perform video recording through the second server based on the stored recording plan;
the second server is configured to control the at least one video device to perform video recording through a target port in the video device; and
the video device is configured to perform video recording;
wherein the first server is composed of N-level servers, the N is an integer greater than or equal to 2, the N-level servers comprise first level first servers within at least two local area networks and an $N^{th}$ level first server, and a device identifier for each of the N-level servers is globally unique;
wherein the $N^{th}$ level first server is configured to, in a case where the recording conditions of the stored target recording plan are met, determine, a first level first server of the first level first servers corresponding to the target video device; and
wherein the $N^{th}$ level first server is configured to control the first level first server, so that the first level first server controls the second server corresponding to the target video device to perform video recording through the target port.

18. The system according to claim 17, wherein the recording plan further comprises time information, and the time information comprises a recording begin time and/or a recording end time;
the first server is further configured to detect recording begin times and/or recording end times of stored recording plans.

19. The system according to claim 17, further comprising: a third server, wherein,
the third server is configured to store videos recorded by the video device through a hard disk to obtain video files.

20. The system according to claim 17, wherein the N is an integer greater than or equal to 3, and the video device is pre-registered on the first server;
a process of registering the video device comprises:
sending, by the video device, device information to the first level first server corresponding to the video device, and storing the device information through the first level first server, wherein the device information comprises device manufacturer information, a username and a password, a device IP address, a device identifier of the video device, and channel information; and
sending the device identifier of the video device to a second level first server through the first level first server, storing the device identifier through the second level first server, and sending the device identifier of the video device, level by level, up to a first server at each level through the second level first server, until the $N^{th}$ level first server in the first server completes storage of the device identifier.

\* \* \* \* \*